United States Patent [19]

Ahmed et al.

[11] Patent Number: 4,786,478
[45] Date of Patent: Nov. 22, 1988

[54] METHOD AND APPARATUS FOR ISOTOPE SEPARATION

[75] Inventors: Samir Ahmed, New York City, N.Y.; John Gergely, Ponca City, Okla.

[73] Assignee: Conoco Inc., Ponca City, Okla.

[21] Appl. No.: 935,073

[22] Filed: Nov. 21, 1986

Related U.S. Application Data

[62] Division of Ser. No. 634,773, Jul. 26, 1984, abandoned.

[51] Int. Cl.[4] .................. B01J 19/12; B01D 59/34; H01J 27/00
[52] U.S. Cl. .................. 422/186.03; 422/186.01; 204/157.2; 204/157.21; 204/157.22; 250/423 P
[58] Field of Search .................. 422/186.01, 186.03; 250/423 P; 204/157.15, 157.2, 157.21, 157.22

[56] References Cited

U.S. PATENT DOCUMENTS

| | | | |
|---|---|---|---|
| 4,000,421 | 12/1976 | Janes et al. | 250/284 |
| 4,020,350 | 4/1977 | Ducas | 250/423 P |
| 4,070,580 | 1/1978 | Gallagher et al. | 204/157.22 X |
| 4,101,396 | 7/1978 | Silfvast | 204/157.1 R |
| 4,197,093 | 4/1980 | Abrams | 250/423 P X |
| 4,297,191 | 10/1981 | Chen | 204/157.1 R X |
| 4,334,883 | 6/1982 | Robinson et al. | 204/157.22 |
| 4,394,579 | 7/1983 | Schwirzke | 250/423 P |
| 4,563,258 | 1/1986 | Bridges | 204/157.22 X |

OTHER PUBLICATIONS

ERDA Energy Research Abstract No. 4561, Feb. 15, 1977, vol. 2, No. 3, p. 473.

Primary Examiner—Teddy S. Gron
Assistant Examiner—Virginia B. Caress
Attorney, Agent, or Firm—Ronald J. Carlson; Cortlan R. Schupbach; Frank J. Kowalski

[57] ABSTRACT

Method and apparatus for isotope separation using the combination of selective pre-excitation by light radiation with further collisional processing in a DC, rf or microwave gas discharge field to recover ionized atoms or dissociated molecules of the selected isotope. Thus, uranium atoms or molecules in gas phase are irradiated in an interaction volume with light radiation of selected wavelength to raise energy states to a relatively stable second or mid-level. At the same time a gas discharge within said interaction volume subjects raised energy atoms or molecules to a collisional process tending to raise a significant number through the energy ladder to the respective ionization continuum or dissociation light whereupon the charged atoms or molecules may be collected as an enriched bulk of selected isotopic species.

9 Claims, 5 Drawing Sheets

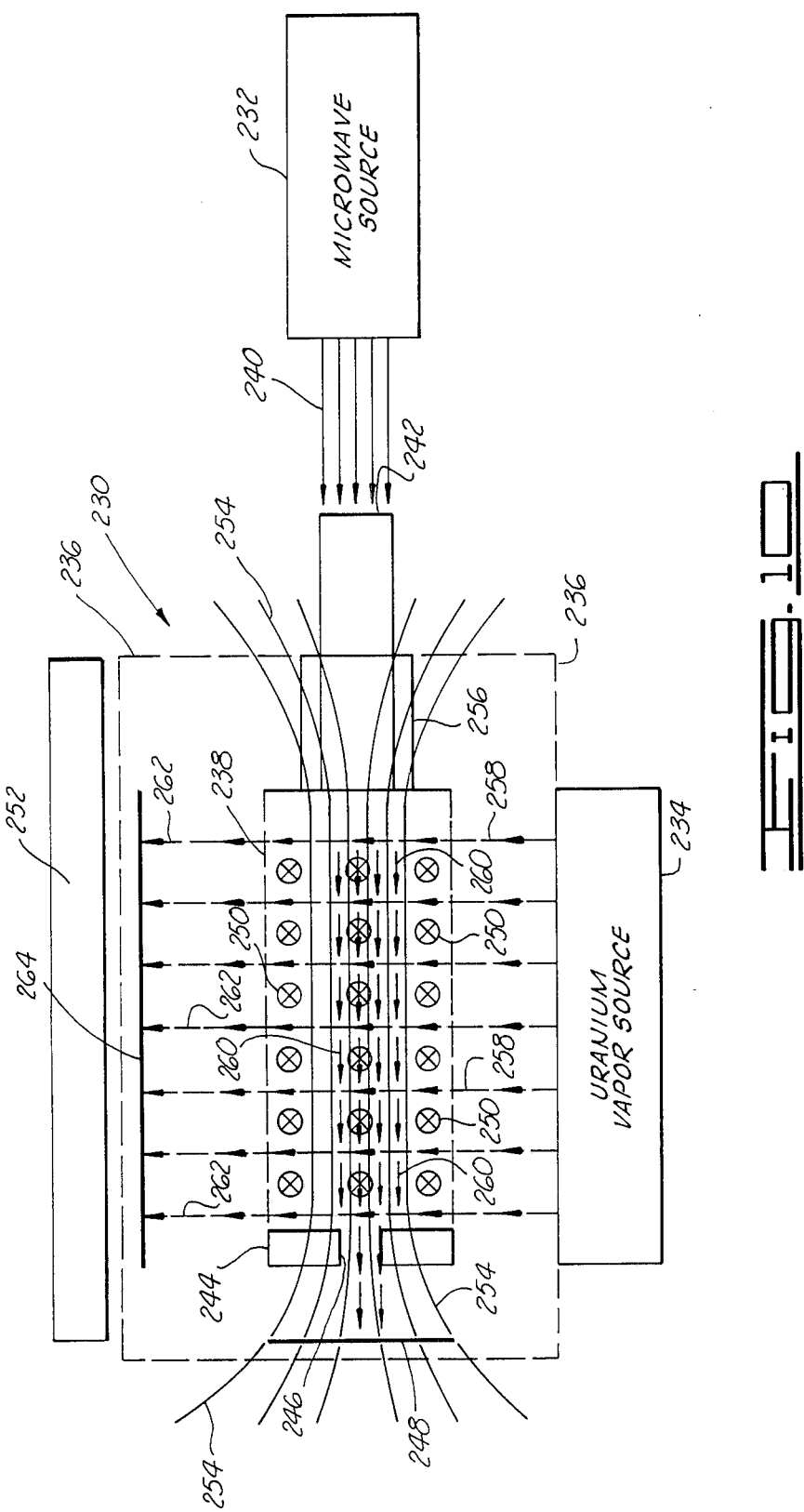

METHOD AND APPARATUS FOR ISOTOPE SEPARATION

This is a divisional of co-pending application Ser. No. 634,773 filed on July 26, 1984, now abandoned.

BACKGROUND OF THE INVENTION

1. Field of the Invention

The invention relates generally to a method for enrichment and/or separation of uranium or other isotopes from isotopic mixtures and, more particularly, but not by way of limitation, it relates to an optical-discharge separation process for separation or enrichment of $^{235}U$ from natural uranium.

2. Description of the Prior Art

Demands of the nuclear power industry require enrichment of uranium in its content of the $^{235}U$ isotope, as such enriched uranium is used in power generating nuclear reactors. Since the advent of nuclear power capabilities, such uranium isotope separation for enrichment purposes was carried out by a process known as gaseous diffusion. The gaseous diffusion process is very electrical power intensive such that the cost of producing separative work units of enriched uranium has become extremely high due to the much increased cost of electricity and fuels used in generating electricity.

Other uranium separation processes are currently being developed. A process known as the gas centrifuge method is presently under construction and should be producing enriched uranium in commercial quantities in the very near future. This process uses centrifugal force to distinguish the slight difference in the weight of uranium hexafluoride molecules containing the $^{235}U$ isotope from those with the more prevalent $^{238}U$ isotope. As the stock material is rotated at extremely high speeds, the lighter molecules are concentrated near the axis of rotation whereupon they are caused to move preferentially downward for separation.

Yet another method of uranium enrichment is currently being developed for large-scale application at Lawrence Livermore National Laboratory and this process is termed atomic vapor laser isotope separation (AVLIS). The AVLIS process utilizes selective absorption of radiation of a particular energy level by the $^{235}U$ isotope. The uranium metal is heated and vaporized for exposure to lasers of predetermined wavelength which selectively ionizes $^{235}U$ atoms in successive steps. The ionized atoms are collected by electromagnetic fields to be formed into the enriched product while the neutral $^{238}U$ atoms pass through the magnetic field for collection as tailings. The process uses such as pumped dye lasers in the visible spectrum.

Still other advanced isotope separation methods are under development such as a molecular laser separation method that utilizes dual laser irradiation for first excitation of the $^{235}U$ containing molecules followed by a second irradiation to dissociate a fluorine atom from the excited molecules to produce enriched uranium pentafluoride as a finely divided solid. This powder is then refluorinated to produce uranium hexafluoride as the enriched product.

Finally, there is a process utilizing plasma separation which begins by vaporizing uranium metal for subsequent ionization into a plasma for inclusion into a high-strength magnetic field and subjection to an electric field tuned to the cyclotron resonance frequency of $^{235}U$ ions. Absorption of energy by ions tends to increase the diameter of their cyclotronic paths so that the $^{235}U$ ions are separable from the $^{238}U$ ions by tangential interception.

All of the proposed advanced isotope separation methods have estimated readiness dates considerably in the future as far as operational application is concerned. None of the processes has been operated at full scale and it is forseen that there are many design and construction problems to be overcome.

SUMMARY OF THE INVENTION

The present invention relates to an improved process for separation or enrichment of $^{235}U$ from natural uranium for production of fuel-grade uranium isotope. The process may be termed an optical-discharge isotope separation method which utilizes a laser or light source of selected wavelength in combination with a gas discharge in the isotopic mixture to be separated. The method is applicable to various forms of isotope but is particularly useful in enrichment of uranium isotope as derived from either an atomic mixture, e.g. natural uranium, or from a molecular mixture such as $UF_6$.

In the optical-discharge technique, a laser or other light source selectively excites the atom or molecule of chosen isotopic composition from the first or ground level to a stable second level. These raised level isotopes are then collisionally ionized from the second level in one or more steps by inelastic electron collisions in a gas discharge. The gas discharge may be energized variously as by D-C, r-f or microwave energy to cause preferential ionization, and the ionized or dissociated isotopic materials are separated by condensing or collecting for assembly as enriched isotope product.

Therefore, it is an object of the present invention to provide a process for producing enriched uranium isotope in greater quantities at much reduced cost of both the basic equipment and requisite electrical energy.

It is also an object of the present invention to provide a more simplified and reliable method for isotope separation.

It is still further an object of the invention to provide a method for processing natural uranium and waste tails of uranium to produce enriched uranium isotope.

It is yet another object of the present invention to provide a method for producing a unit amount of enriched isotope material while consuming far less electrical power in the production.

Finally, it is an object of this invention to provide a reliable yet highly efficient method and apparatus for separation and/or enrichment of either atomic or molecular isotopic substance.

Other objects and advantages of the invention will be evident from the following detailed description when read in conjunction with the accompanying drawings which illustrate the invention.

BRIEF DESCRIPTION OF THE DRAWINGS

FIG. 10 is a schematic diagram of yet another form of isotope separate apparatus using microwave induced discharge.

DETAILED DESCRIPTION OF THE INVENTION

Figure 1A:
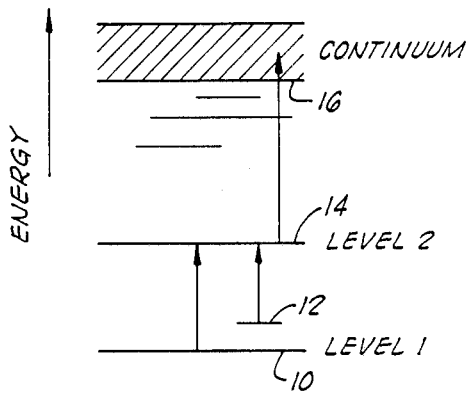
FIG. 1A is a graphic depiction of atomic energy levels in a photo ionization scheme.

FIGS. 1A, 1B, 2A and 2B illustrate energy level progressions characteristic of prior art laser isotope separation techniques. FIG. 1A illustrates atomic energy levels for an atom of isotope as it is excited from the ground level 10 or level 1 into the ionization continuum for subsequent separation from non-ionized species in the environment. The atoms are selectively excited to the ionization limit by sympathetic excitement with tuned laser energy at selected wavelengths. Thus, laser photons, e.g. in the visible or near ultraviolet, are tuned to match the absorption transition of the particular isotope of interest from the ground level 10 or a metastable level 12 near the ground level 10 which has an appreciable population density as the operating temperatures. Such absorption raises the atom to the energy level 14 whereupon additional visible or ultraviolet excitation by laser photons at selected matching wavelength imparts sufficient energy to excite the atom to the higher energy level or ionization continuum 16 for subsequent collection in the bulk of enriched atomic isotope. This is prior art laser isotope separation technique.

Figure 1B:
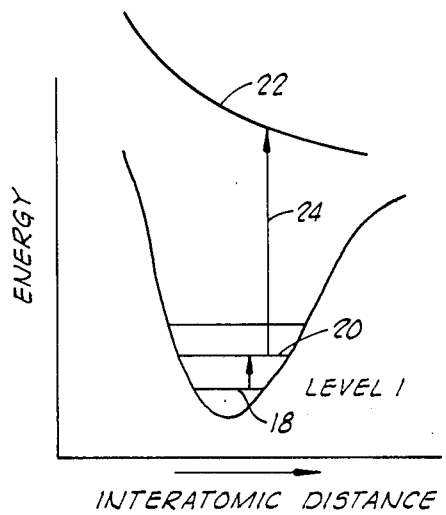
FIG. 1B is a graphic depiction of energy levels in a photo dissociation relationship.

FIG. 1B illustrates prior art laser isotope separation by photo-dissociation wherein a molecular isotope is optically excited by a series of laser excitations to the dissociation limit whereupon the dissociated molecules can be collected for inclusion in the enriched isotope bulk. Thus, laser photons of selected wavelength in the infra red optically excite and cause the absorption transition of the isotope of interest from the ground level 18 or a level 20 near ground level that happens to have appreciable population density at the operating temperature. Additional excitation by laser photons of sufficient energy, typically in the visible or near ultraviolet range, then raise the isotopically distinct molecule of interest from the level 20 up to the dissociation limit 22, as indicated by arrow 24. This results in a mixture of dissociated molecules bearing the chosen isotope as well as unexcited molecules and these can be separated by well-known means to produce the enriched isotope bulk.

Figure 2A:
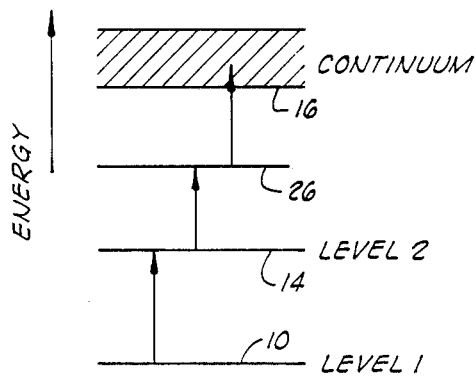
FIG. 2A illustrates energy levels in a plural excitation ionization.
Figure 2B:
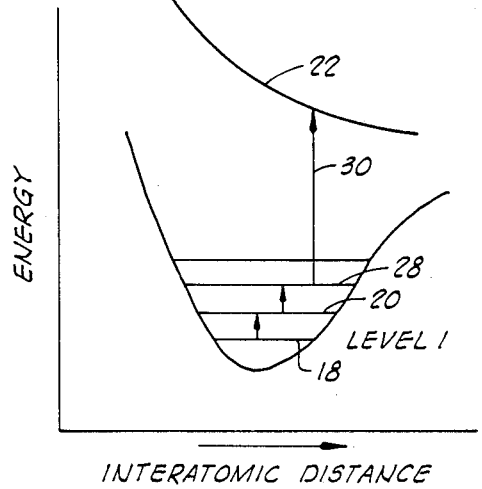
FIG. 2B illustrates energy levels in a plural excitation molecular dissociation.

FIGS. 2A and 2B also represent prior art energy schemes, the difference being that the second steps starting from level 2 are excited selectively in two steps to the ionization continuum 16 or photo-dissociation limit 22. Thus, in FIG. 2A, selectively excited atoms at energy level 14 are further excited by a second irradiation to an intermediate level 26 with further optical excitation to the continuum 16. In like manner, FIG. 2B illustrates the molecular photo-dissociation from second level 20 to an intermediate level 28 with still further optical excitation raising the energy to the dissociation limit 22 as indicated by line 30. Once ionization or dissociation of the isotopic species of interest has been achieved, the selectively ionized or dissociated species may be separated and collected by a variety of means including electrodes and/or magnetic field (in the case of ionization) or by chemical scavenging (in the case of dissociation processes).

Thus, in the prior laser isotope separation methods, the further excitation of the selectively excited species from level 2 to the ionization or dissociation limits required intense radiation at the required wavelengths for the transition increasing from the second level in order that the photo-ionization or photo-dissociation process can successfully compete with radiative or other de-excitation of the selectively excited species back to the ground level. Generally, therefore, a laser would be required to provide the radiation necessary for the further transition from level 2 up to the ionization or dissociation limit. Considering the relatively low efficiencies of lasers, this adds considerable energy requirements and hence costs to the process.

Figure 3A:
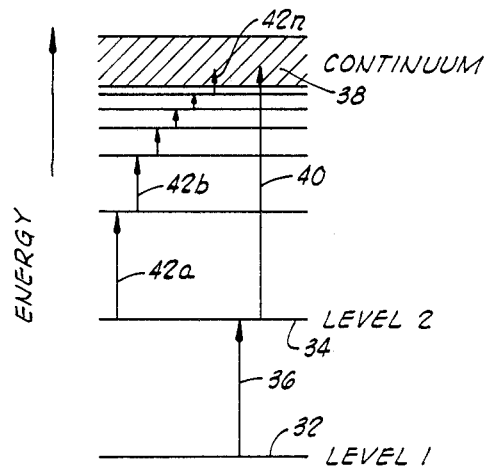
FIG. 3A is an energy level diagram depicting possible excitation steps as achieved in the present invention.
Figure 3B:
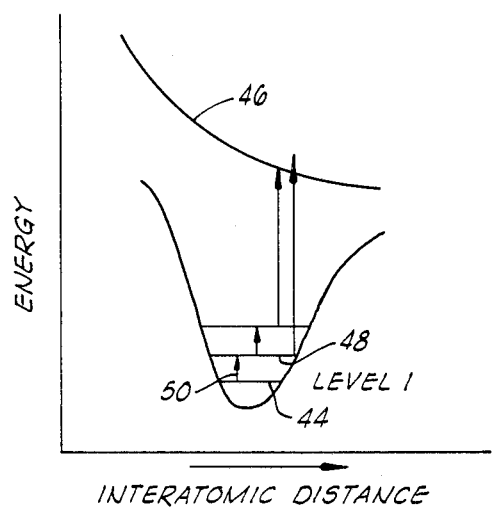
FIG. 3B is a graphic depiction of energy levels excited through molecular dissociation in accordance with the present invention.

FIGS. 3A and 3B illustrate respective atomic and molecular energy levels for he optical-discharge isotope separation method of the present invention. FIG. 3A illustrates the basic mechanism for ionization as a tuned laser selectively excites atoms of chosen isotopic composition from the ground or first level 32 to second level 34 as along arrow 36. This is an isotopically selective optical excitation just as was performed in previous schemes. At this point, the method diverges as the atoms at second level 34 are collisionally ionized from level 34 in one or more steps as indicated by arrow 40 or arrows 42a-n by inelastic electron collisions in a gas discharge. Atoms that have been selectively excited to second level 34 are preferentially ionized in comparison to non-excited species of other isotopes, which, since they have not been selectively optically excited, would be at or near the ground level 32. The selective excitation along arrow 36 to second level 34 is effected by photons in the visible or near ultraviolet for atomic species $^{235}U$.

FIG. 3B illustrates energy levels for dissociation of molecular species from ground level 44 through the dissociation limit 46. The first step from ground level 44 to level 48 is effected by isotopically selective excitation by light photons, as shown by arrow 50. Progression through energy levels above second level 48 to dissociation limit 46 is brought about in an electrical discharge by inelastic electron collisions with those molecules selectively excited to the second level 48. Such collisional dissociation process can be by single or multiple step to the dissociation limit 46, this depending upon probabilities. The selective optical excitation of molecules at ground energy level 44 may be effected with photons in the infrared for excitation of molecular species $^{235}UF_6$.

In the case of infrared excitation, photons of a single wavelength may also selectively excite molecules of an isotopic species of interest from the ground level through several steps up the vibrational ladder. The first phase excitation would then be followed by a second phase of preferential ionization or dissociation by an electric discharge, i.e. inelastic electron collisional ionization or dissociation of that isotopic species preferentially photoexcited in phase one. Obviously, collisional ionization or dissociation is preferential for a species already selectively excited in to a second energy level because these atoms or molecules are, as a consequence of selective excitation, already much closer to the respective ionization or dissociation limits.

Figure 4A:
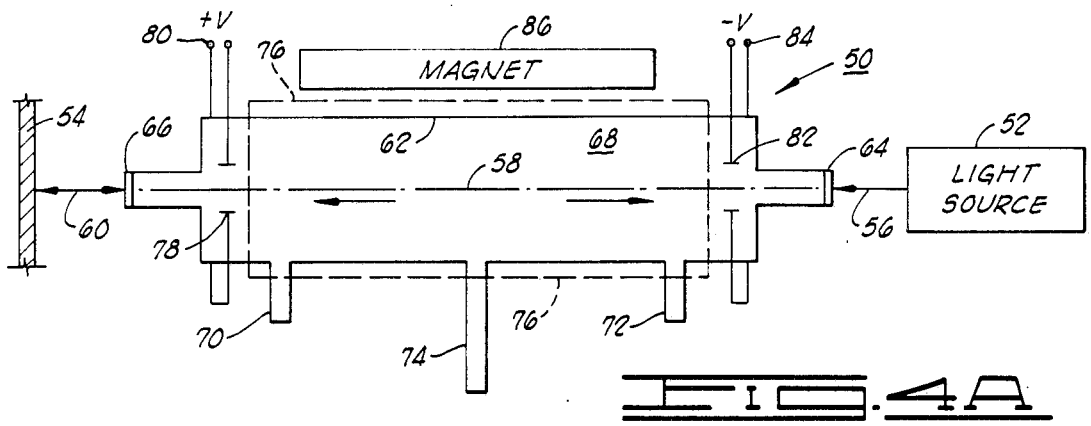
FIG. 4A is a schematic illustration of a basic isotope separation apparatus as utilized in the present invention.

FIG. 4A illustrates a basic form of apparatus for carrying out the present invention. A process tube 50 is utilized in aligned coaction with a light source 52 and a reflector or mirror 54. Light source 52 is aligned to radiate light energy along path 56 and an interaction axis 58 for light communication via path 60 with mirror 54. The process tube 50 is a vacuum envelope 62 formed with oppositely-disposed, axially-aligned window elements 64 and 66 that allow reciprocal light energy propagation along interaction axis 58. The window elements 64, 66 may be disposed at the Brewster angle to reduce reflection losses when a laser is used as the light source. In order to initiate and sustain gas discharge, a buffer gas 68 such as argon, helium, neon, krypton, zenon or other inert gases may be contained within the envelope 62.

The envelope 62 is further formed along the ends on one side to include unitarily formed cold spot extensions 70 and 72 which serve to condense and collect isotopically distinct material that is separated by the process. A centrally aligned, unitarily formed extension 74 provides an isotope feed inlet for introduction of the selected source of isotopically mixed material. Such isotope input feed control could be effected by temperature or vapor pressure variation or by a more intricate feed valve arrangement. An oven 76 may be placed in enclosure of the primary reaction portion, i.e. the enlarged central part, of envelope 62. The oven 76 may then be controlled to apply very high temperatures in order to volatilize certain materials for processing.

A first pair of electrodes 78 are disposed at one end of envelope 62 in coaxial disposition to the interaction axis 58, and electrodes 78 may serve as a D-C discharge anode by being connected to a selected positive voltage source 80. At the other end of envelope 62, a pair of co-axial electrodes 82 are energized from a suitable negative voltage source 84 to function as the D-C discharge cathode. A suitable magnet 86 may be disposed azimuthally around the interaction region 62 to provide magnetic lines of force that lie parallel to main axis 58. Magnet 86, generally illustrated, may be any of various specially constructed magnets, e.g. a cylindrical magnet surrounding enclosure 62 and axis 58 and effective to provide intense magnetic field along the interaction axis 58.

In the embodiment of FIG. 4A, the secondary operation or discharge is a direct current (D-C) discharge, while a light source 52 supplies the photon radiation at the appropriate wavelength to selectively pre-excite the isotope of interest from ground level to a level 2. The selectively excited atoms or molecules that attain energy level 2 are then preferentially ionized or dissociated, respectively, in the D-C discharge in preference to the non-excited species of the other isotopes which, since they are not selectively optically excited, would largely be at the ground energy level energy.

The preferential ionization or dissociation by the discharge of those atoms or molecules raised up to the excited level 2, is a natural consequence of the fact that in such a gas discharge there are many more electrons, i.e. by an exponential factor, with energies capable of ionizing or dissoiating species already at the level 2, than in ionizing or dissociating species from level 1 whether by single-step or multi-step collisional processes. In fact, because of the general case wherein there is closer spacing of available levels between level 2 and the ionization limit as compared to those between level 1 and level 2, multi-step ionization processes from level 2 are likely to be even further preferentially enhanced relative to ionization from level 1. Therefore, it is to be expected that an isotope of interest will be preferentially ionized or dissociated by the energy discharge if it has previously been subjected to the selective optical pre-excitement by such as laser radiation.

The energy supplied from the discharge phase is that required to collectively excite the atoms or molecules from levels 2 to the ionization continuum or dissociation limits, respectively. If the level 2 is chosen so that it has a relatively long radiation lifetime, e.g. more than $10^{-6}$ seconds, it is then possible to ensure that the electron collisional ionization or dissociation of the selectively pre-excited species in level 2 is likely to be relatively efficient and require only low electron and discharge current densities. With such higher efficiencies, the whole selective ionization or dissociation part of the ionization process is likely to have greatly improved efficiency over prior techniques such as the atomic vapor laser isotope separation process; that is, the process using plural tuned lasers for two or more steps of selective, successive photo-excitation through the continuum or dissociation limit.

Once obtaining the preferential ionization of an isotope of interest, or the preferential dissociation of a molecule containing the isotope of interest, the separation from non-ionized or non-dissociated species can then be carried out in any of a number of ways such as electrically polarized collectors, magnetic separation, vapor pressure differentiation, molecular chemical scavenging and the like. In addition, the combined optical-discharge method is availed of some other special advantages which further facilitate the separation process. When a D-C electrical discharge is used for separation, as shown in FIG. 4A, electrophoresis effects tend to separate different species of a mixture through which the discharge is running in accordance with the individual species response to the D-C potentials. In general, more readily ionized species will be driven by the discharge toward the cathode electrode 82, while the less readily ionized species will be drawn towards the anode electrode 78. Thus, there is realized an additional separation effect along the interaction axis 58 of the discharge process tube 50 depending upon the D-C current and the gas densities relative to the discharge tube diameter.

By having cold spots near opposite ends of the process tube envelope 62 as at extensions 70 and 72, the respective differently separated isotopic species may then each be condensed preferentially at the appropriate end of the envelope 62 as the condensate will be enriched in species drawn to the respective end. In like manner, the selectively excited, and hence more readily dissociated species of interest, will also be preferentially separated from the less readily dissociated species axially along interaction axis 58. Actually, in the case of preeerential dissociation of molecules, axial separation may be less important since once the preferential molecular dissociation has been effected by the optical-discharge method, the different vapor pressure of the dissociated molecular species can be used to preferentially separate it by condensation anywhere along the axis of the discharge envelope 62.

As an additional force or improvement to the separation method using the equipment of FIG. 4A, an axial magnetic field set up by the magnet 86 may be applied so that the lines of force concentrate along the interaction axis 58. If the magnetic field is strong enough, e.g. one kilogauss and greater, this has the effect of greatly reducing charged particle losses to the walls of envelope 62, and has the overall effect of making the discharge ionization (or dissociation) phase of the process more efficient. In addition to higher efficiency, the application of the axial magnetic field has a very great effect in increasing the axial cataphoretic pumping or separation of the preferentially excited and ionized species. This increased pumping separation also increases separation yield.

In one form, the discharge used can be of the relatively low electron and current density type, similar in principal to that of the fluoreseent lamp discharge. In FIG. 4A, potential difference across coaxial electrodes 78 and 82 will control the discharge current density along interaction axis 58, a suitable buffer gas 68 being present within vacuum envelope 62. If extremely high ionization rates are required, the discharge current densities can be greatly increased to values similar to those existing in ionized gas lasers. In addition, the discharge phase of the process may be effected by r-f energy excitation with capacitive or conductive type coupling or microwave energy radiation, as will be further discussed below.

Figure 4B:
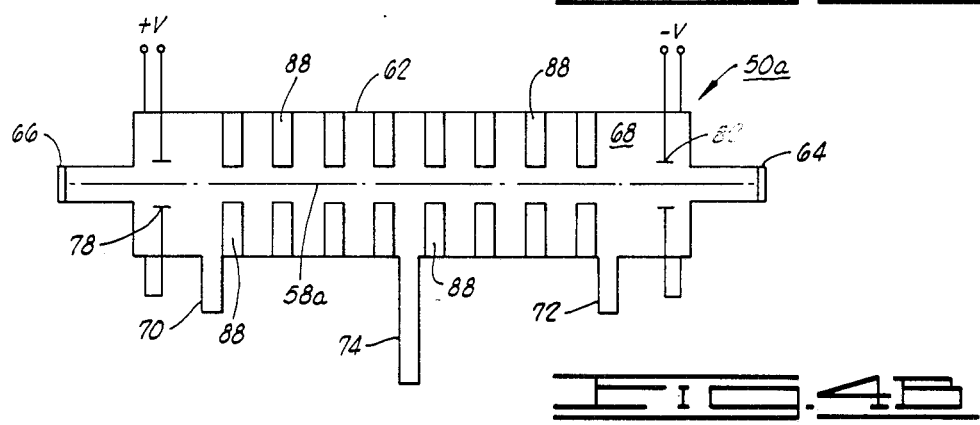
FIG. 4B illustrates the vacuum envelope of FIG. 4A with the inclusion of a plurality of disc apertures.

FIG. 4B illustrates an alternative form of process tube 50a wherein the vacuum envelope 62 includes a plurality of equi-spaced disc apertures 88 disposed along the interior of envelope 62 and defining the central interaction axis 58a. The disc apertures 88 may be formed from sputtering-resistant material such as graphite and function to confine the discharge along interaction axis 58a in conjunction with the axial magnetic field and other discharge forces, i.e. D-C, r-f, microwave. For both the D-C and r-f discharges it is advantageous to use the aperture-magnetic confinement discharge method thereby to reduce further any wall losses and to increase the efficiency and separation effects along interaction axis 58a.

The light source 52 may be any of various types of commercially available laser source, either CW or pulsed control, that emits collimated light through window 64 and along interaction axis 58 at a selected wavelength that is suitable for raising the isotopic species of interest from level 1 to a level 2. For example, laser light having wavelength at 378.1 nanometers would selectively pre-excite the $^{235}U$ isotope to a level 2 energy for further subjection to the gas discharge phase of the process.

The total cross-section for electron-collisional ionization of uranium atoms in uranium gas have been readily measured. The single ionization cross-section was found to have a threshold in the vicinity of the ionization potential, i.e. above 6.187 electron volts. The corresponding cross-sections are approximately 5 times $10^{-16} cm^2$ for electron energies in the 7 to 15 volt range and these energies increase slightly above that range. It can also be established that the vast majority of ions is created by electron collisions with unexcited uranium atoms at the ground level. Thus, the cross-section approximating 5 times $10^{-16} cm^2$ can legitimately be taken as the electron-collisional ionization cross-section for electron impacts with unexcited ground state uranium atoms.

If it is assumed that a level 2 of the uranium atom is the $7S7P^7M_7$ level, approximately 2.2 electron volts above the ground level, that is excited by 591.5 nanometer raditaion from a copper-vapor-laser-pumped-dye laser; or, is another energy level 4 electron volts above the ground level, excited by an excimer-laser-pumped-dye laser at approximately 300 nanometers, then it can be expected that the electron-collisional ionization cross-sections from these excited levels will be significantly higher than those from the ground state. Thus, it can be shown that the electron-collisional ionization cross-sections for pre-excited atoms, as above, can be from 15 to 40 times higher than those for electron-collisional ionization from the ground level.

In addition to the intrinsically higher ionization cross-sections for excited states, lower threshold values also tend to increase the ionization probability. A gas discharge can take advantage of this because there is, in general, a larger number of slower electrons capable of collisionally ionizing from the excited levels than there are faster electrons capable of ionizing from the unexcited ground level. Thus, uranium densities that may be expected to be used in the interaction region may approximate 3 times $10^{14}$ atoms per $cm^3$, and such densities bring about electron temperatures in a range of approximately 0.8 to 1.5 electron volts, a range similar to that existing for low pressure mercury discharges as well-known in the prior art. The actual temperature will depend on the geometery and dimensions of the interaction region, the nature and rate of charged particle diffusion losses, and the pressure of any additional buffer gas.

In addition to using lasers at light source 52 for the excitation of the first step from the ground level, it is also possible to use an isotopically pure gas discharge lamp to provide the first phase selective excitation. To obtain an isotopically pure gas discharge lamp with a low volatility element like uranium, it may be advantageous to introduce it as a halid in the discharge, and have the lamp operate on well-known halogen cycle. Thus, the discharge lamp would actually contain an isotopically pure species to be selectively excited, e.g. $^{235}U$, plus an inert buffer gas, as aforementioned, in order to help initiate and maintain the discharge.

Figure 5A:
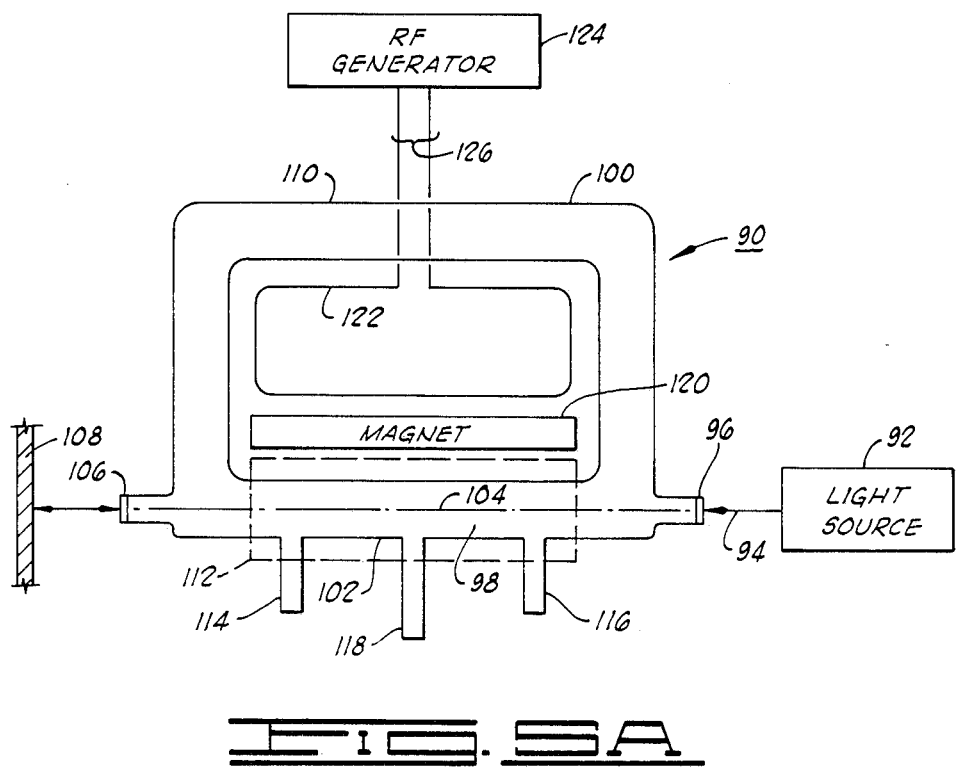
FIG. 5A illustrates an alternative form of vacuum envelope that may be utilized with RF inductive excitation of gas discharge.

FIG. 5A illustrates an optical-discharge isotope separation system 90 wherein the second phase discharge of the process is carried out by introduction of r-f energy. Thus, a light source 92 emitting light radiation of selected wavelengths along a collimated beam 94 is directed through a window 96 into the interaction region 98 of a generally rectangular vacuum envelope 100. Envelope 100 consists of an interaction portion 102 defining region 98 for receiving light radiation along the interaction axis 104 in alignment with an opposed window 106 and mirror 108. Envelope 100 further includes a generally rectangular tubular portion 110 in communication with opposite ends of interaction portion 102, a suitable buffer gas being present in the evacuated interior. An oven assembly indicated as dash-line 112 envelops the interaction portion 102. Interaction portion 102 also includes the coldspot collectors 114 and 116 and an isotope feed extension 118.

A magnet, indicated generally at 120, provides an intense magnetic field axially of interaction tube portion 102 as along interaction axis 104. The magnet 120 may be any of various and well-known shapes, e.g. a cylindrical magnet providing an intense central axial field. The second phase of the ionization or photo-dissociation to the continuum or limit, respectively, is effected by such as inductive coupling of r-f energy from a coupling loop 122 aligned in close association with the buffer gas containing tube portion 110. The r-f coupling loop may be energized by a suitable radio frequency output from r-f generator 124 as output on lines 126. The frequency output from r-f generator may be varied to achieve maximum ionizing efficiency as lower radio frequency energy may be inductively coupled into tube portion 110 while very high frequency outputs may be capacitively coupled from loop 122 to bring about effective second stage ionization processing.

Figure 5B:
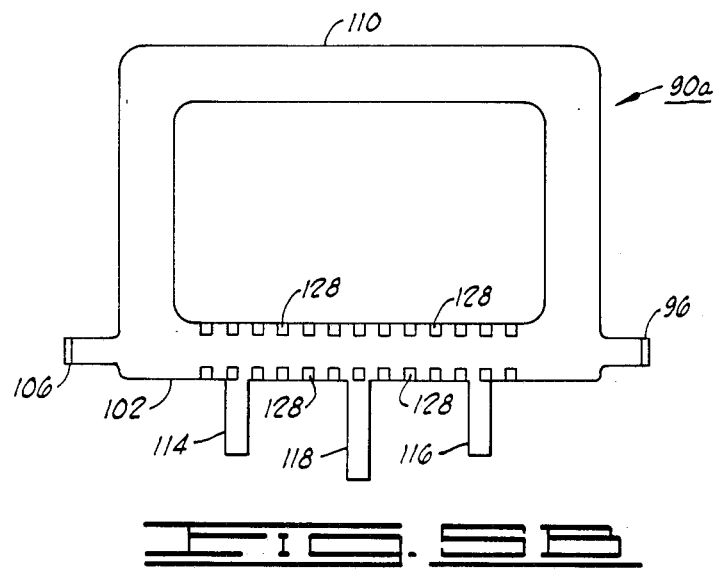
FIG. 5B illustrates the vacuum envelope of FIG. 5A while including a plurality of disc apertures.

FIG. 5B illustrates an alternative form of processing tube 90a which is constructed similar to process tube 90 of FIG. 5a except that it includes the plurality of equi-spaced disc apertures 128 of sputtering-resistant material disposed along the length of interaction tube portion 102. Thus, the disc apertures 128 serve to confine the second phase discharge in conjunction with the axial magnetic field.

Figure 6A:
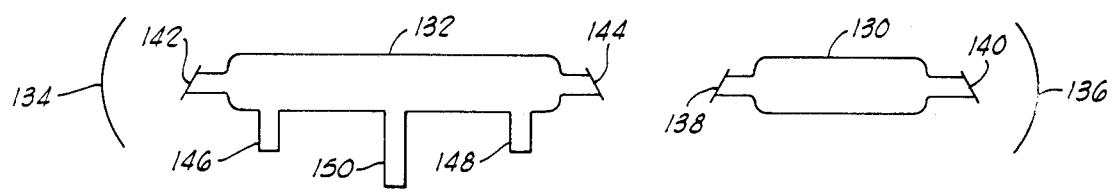
FIG. 6A illustrates another form of laser/process tube combination as utilized in the present invention.
Figure 6B:
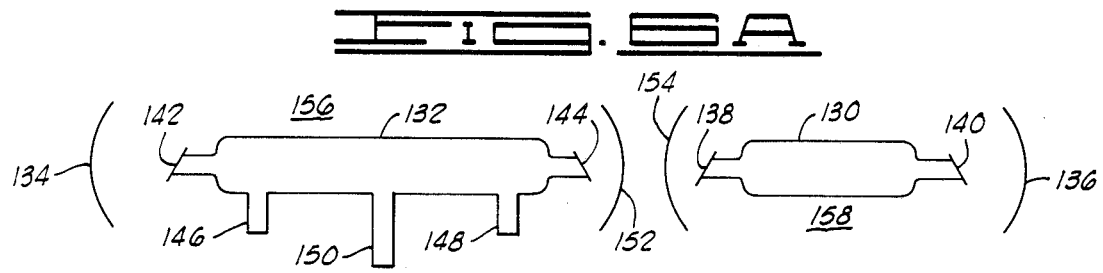
FIG. 6B illustrates an alternative form of laser/process tube combination.

FIGS. 6A and 6B illustrate an alternative form of apparatus that is capable of increasing intensity of laser radiation in order to provide selective excitation and discharge in accordance with the present invention. A laser 130 is disposed in axial alignment with a process tube 132, such axis being the normal between opposed laser cavity mirrors 134 and 136. Opposite ends of the laser source 130 include Brewster angle windows 138 and 140 while similar windows 142, 144 are disposed in axial alignment on process tube 132. The tube 132 includes the collector coldspot extensions 146 and 148 and a feed inlet extension 150.

In FIG. 6A, the discharge process tube 132 containing the isotopic mixture to be separated is actually made part of the laser resonator as the light intensity is greatly increased within the cavity between mirrors 134 and 136. That is, the mirrors 134, 136 feed back energy from the plasma in the excited second level resulting in increased light intensity from both the laser 130 and the vapor source within process tube 132.

FIG. 6B illustrates a similar cavity resonator wherein the discharge tube 132 is made part of a second resonator to which the laser light from laser 130 is coupled. Additional interposed mirrors 152 and 154 define the two distinct cavities 156 and 158, each of which becomes a separate optical resonator that are coupled to one another through the spherical resonator pairs 134–152 and 154–136, respectively. It should be re-emphasized that the above approach is applicable to both atomic and molecular isotopic mixtures, e.g. atomic uranium and UF$_6$ or the separation of $^{235}$U from a mixture of $^{235}$U and $^{238}$U.

Figure 7:
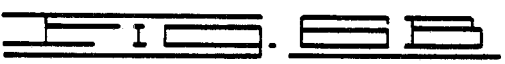
FIG. 7 depicts energy levels when utilizing plural laser wavelength irradiation to excite the ground or near-ground metastable energy levels in the process of the present invention.

For the atomic species, the first selective optical excitation step, i.e. level 1 to level 2, would be in the near ultraviolet or visible and would require near ultraviolet or visible radiation at a specified wavelength to match transitions in one isotope from level 1 to level 2. It should also be noted that several such transitions may be excited simultaneously. Thus, as shown in FIG. 7, this might be done by using several lasers each tuned to an appropriate frequency to excite a level from the ground level 160 for the isotope of interest. An atom such as $^{235}$U would have a number of transitions from ground level 160 in the visible and the near ultraviolet that can be excited sumultaneously in this manner. If carried out, this selective simultaneous optical excitation from ground level 160 upward through various stable second levels 162 would greatly increase the population of excited isotopes at level 2 thereby greatly enhancing the probability for separation of isotopes to the continuum 164 by the second phase discharge process.

Figures 8A, 8B:
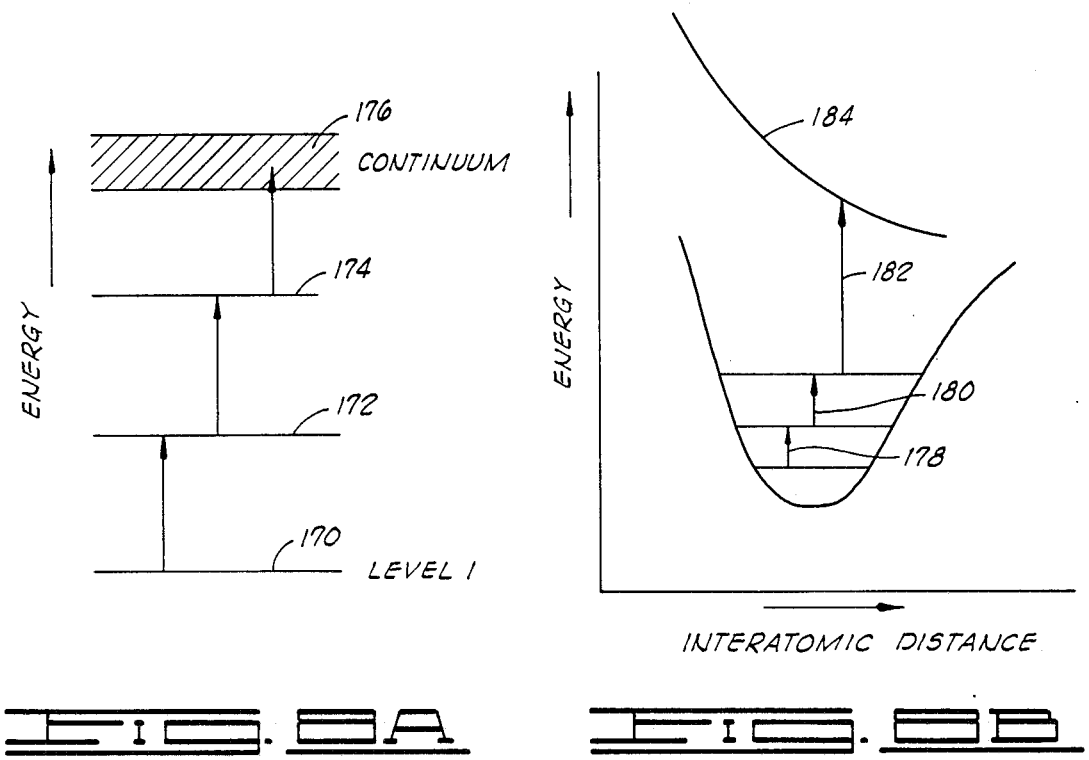
FIG. 8A illustrates energy levels for a three-step ionization scheme.
FIG. 8B illustrates the three-step process for molecular dissociation of enriched products.

Another variation on the basic optical-discharge method of isotope separation is illustrated in FIGS. 8A and 8B for atomic ionization and molecular dissociation, respectively. In this situation, two or more consecutive pre-excitation steps are effected prior to the final discharge excitation phase which takes the particle to the ionization continuum, FIG. 8A, or the dissociation limit as in FIG. 8B. Consecutive optical pre-excitation steps can improve the overall selectivity of the optical-discharge process, yet because of the efficiency of the discharge phase, there will still result an overall cost effective process.

FIG. 8A illustrates the situation wherein species isotope at ground level 170 is selectively pre-excited by a first optical stimulation to a second stable level 172 and then successively further stimulated by selected wavelength light to a stable level 174 for subjection to the discharge process and passage to the ionization continuum 176. FIG. 8B illustrates the similar energy change for a molecule of selected isotope as two specific irradiation steps take the molecule through energy transitions 178 and 180 whereupon D-C or r-f discharge takes it through final transition 182 into the dissociation limit 184.

Figure 9:
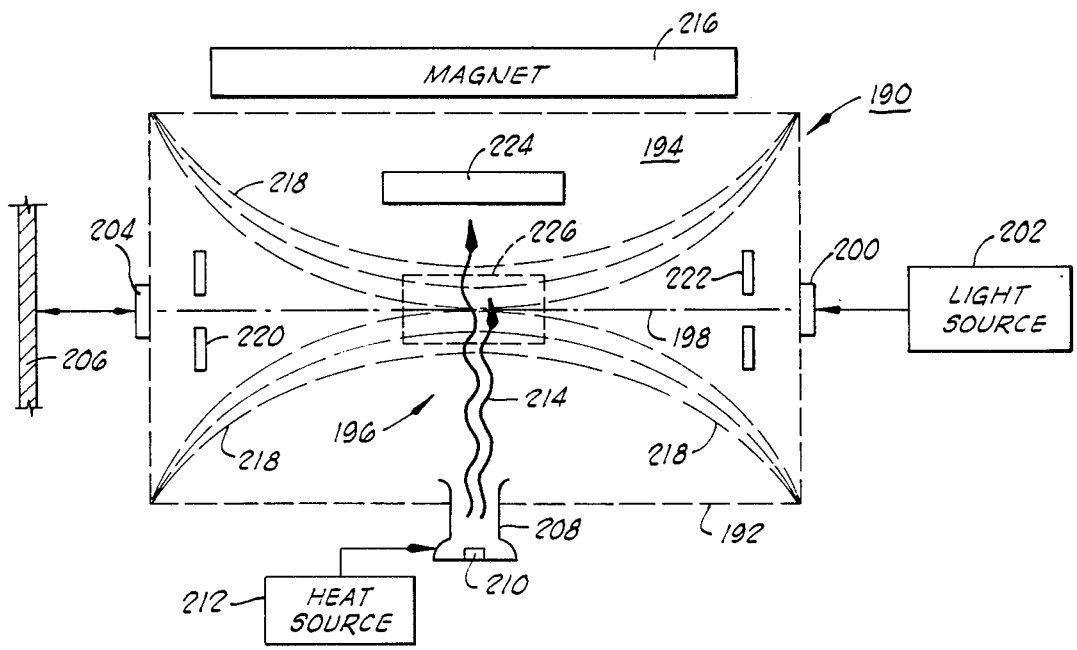
FIG. 9 is a schematic diagram of another alternative form of structure for separating isotope product.

FIG. 9 illustrates yet another embodiment of structure that can be utilized in carrying out the present invention. A process tube 190 consists of a vacuum envelope 192 including the requisite buffer gas 194, as aforementioned. Envelope 192 defines a generally central interaction region 196 lying along an interaction axis 198. The envelope 192 includes an axially aligned optical window 200 for receiving illumination from light source 202, viz. a laser source providing light radiation having a wavelength suitable for preexciting a selected species isotope or molecule to its higher energy levels. Light radiation from source 202 is aligned along interaction axis 198 through an oppositely disposed envelope window 204 for reverberative travel between a normally-disposed mirror 206 and the interior of envelope 192.

The envelope 192 is adapted to include a nozzle 208 for containing a source of isotopic mixture 210. Heat applied from a suitable heat source 212 to the mixture 210 then allows flow in vapor form of the isotopic mixture from the nozzle 208 across the interaction region 196 as shown by curved arrows 214. A magnetic field set up by a suitable magnet 216, as indicated by force lines 218 concentrating axially along the interaction axis 198, tends to inhibit motion of charged particles, i.e. electrons and ions, at right angles to the magnetic field 218 thereby to constrain the ionized species to move towards opposite sides of envelope 192 toward respective condensers 220 and 222. A condenser 224 is disposed to intercept vapor flow 214 that passes through the interaction region 196 while remaining uncharged.

The discharge portion of the process in process tube 190 may be carried out by either the D-C or r-f discharge modes of operation as previously set forth. Thus, the process tube 190 includes a suitable buffer gas 194 to support such as a D-C discharge between spaced electrodes as shown in FIG. 4A. Alternatively, it may also be effective to include specific r-f coupling to the interaction region 196. Still further, the discharge function may be carried out by coupling such as extremely high frequency microwave energy through the interaction region 196 as input by a wave guide or feed horn device, indicated generally as dash-line 226. The microwave energy may be directed at right angles to the interaction axis 198.

The isotopic mixture 210 to be separated may be made to flow out of the nozzle 208 when vaporized and to flow transversely across interaction region 198 wherein the selected D-C or r-f discharge field is magnetically confined by means of magnet 216 and axial field 218. Isotopic atoms of interest are optically, selectively excited in the region 196 by laser light from source 202 or, alternatively, an isotopically pure excitation lamp. The selectively, optically pre-excited atoms are then preferentially ionized in the discharge and such preferentially ionized ions as confined in the magnetic field 218 will exit at the ends where they can be collected, e.g. by electrodes or as by condensation on cold trap surfaces such as at condensers 220 and 222. Other isotopes that are not ionized could continue to flow out of the discharge region 196 across the magnetic field 218 after which they can be condensed and removed from condenser 224.

To allow ease of access, the magnetic field 218 in the interaction region 196 can be provided by means of two separated axial coils 216. If D-C discharge excitation is used, the magnetic field can be opened, i.e. weakened or reduced, at one end where electrophoresis will cause the preferentially ionized ions of the isotope of interest to exit, while at the other end other species to be discarded may be collected through a magnetic field opening. In r-f discharges also, the magnetic confinement can be open at the ends to allow efficient extraction of ionized species.

FIG. 10 illustrates another form of optical discharge process tube 230 that uses a microwave source 232 for excitation of the discharge phase of the isotope separation process. Thus, a suitable uranium vapor source 234 is used in conjunction with a vacuum envelope 236 that defines an interaction volume 238 therethrough. Microwave energy transmission at extreme high frequency, e.g. at electron ccclotron frequency, is directed as at 240 through a microwave vacuum window 242, e.g. a LEXAN panel, and through the interaction volume 238. The rear end of volume 238 may be partitioned by a microwave cut-off block 244 having an orifice 246 to allow flow of ionized uranium atoms to the collector plate 248.

Suitable laser energy may be directed transverse to the interaction volume 238 as shown by directive tail indications 250, i.e. light energy flow is into the page as shown. A magnet 252 of suitable cylindrical formation provides a magnetic field with lines of force 254 longitudinally concentrated through the interaction volume 238. A vapor trap 256 may be provided to control vapor migration from the interaction volume 238.

Thus, uranium vapor atoms move as along arrows 258 through volume 238 where they are selectively raised to upper energy levels upon irradiation from light energy as shown by arrows 250. The isotope material within volume 238 is then subject to microwave irradiation along arrows 260 and fully ionized species move through orifice 246 to collector plate 248 as aided by the magnetic force field 254. Any un-ionized atoms within volume 238 may proceed as along arrows 262 for accumulation at a collector plate 264.

The process tube 230 of FIG. 10 illustrates the relative simplicity of optical-discharge isotope separation equipmentation when compared to prior art structures. There is required only a single tunable laser source coupled with a selected high-efficiency discharge. Thus, the electrodeless microwave discharge operating into the interaction region within a concentrated magnetic field provides a scheme having numerous possibilities for both molecular and atomic irradiation and isotope separation.

The foregoing discloses a novel process for separation or enrichment of selected isotopic substance either in atomic or molecular form. The process consists of a two-phase operation wherein specimen mixture containing selected isotope material is selectively, optically excited to a raised energy level whereupon phase two of the process places the excited isotopic substance in a discharge field whereupon collisional processes raise the energy level to the ionization continuum or the photo-dissociation limit for the respective atomic or molecular isotope mixture. The method is capable of greatly reducing the expense and power consumption necessary to produce an enriched isotopic species. Such process is particularly attractive to the nuclear power industry wherein it is necessary to produce enriched uranium isotope in considerable quantity.

Changes may be made in combination and arrangement of elements as heretofore set forth in the specifications and shown in a drawing; it being understood that changes may be made in the embodiments disclosed without departing from the spirit and scope of the invention as defined in the following claims.

The embodiments of the invention in which an exclusive property or privilege is claimed are defined as follows:

1. Apparatus for separating of a selected isotope from a uranium substance, comprising:
   an evacuated envelope defining an interaction volume extending along an interaction axis between first and second light transmissive window elements, and including a feed inlet for input of uranium substance at a point mid-way along said axis;
   a plurality of disc aperture members formed from sputtering-resistant material disposed in equal spacing along the interior of said evacuated envelope and defining the interaction axis through the apertures thereby to reduce wall losses and increase efficiency;
   inert buffer gas contained in said interaction volume;
   a light source of wavelength to excite a selected isotope to a predetermined increased energy level, said light source being focused to direct a light beam through said first window element in alignment with said interaction volume axis to said second window element;

reflector means for reflecting reverberation of said light beam between said first and second window elements;

oven means maintaining said interaction volume at a controlled elevated temperature;

magnet means providing a magnetic field that is concentrated in alignment along the interaction axis;

electrical means for producing an electrical energy differential along said interaction axis to effect gas discharge collisions of said selected isotopes at increased energy levels thereby to produce ionized selected isotopes; and means for collecting said ionized selected isotopes.

2. Apparatus as set forthe in claim 1 wherein said electrical means comprising:

first and second paris of electrodes disposed at opposite ends of the interaction volume and being energized to produce a D-C potential axially across the interaction volume.

3. Apparatus as set forth in claim 1 wherein said electrical means comprises:

means for generating radio frequency energy of selected frequency; and coupling means for inductively coupling said radio frequency energy through said interaction volume.

4. Apparatus as set forth in claim 1 wherein said electrical means comprises:

means for generating radio frequency energy of selected frequency; and coupling means for capacitively coupling said radio frequency energy through said interaction volume.

5. Apparatus as set forth in claim 1 wherein said electrical means comprises:

a source for generating and directing a field of microwave radiation of selected wavelenght through said interaction volume.

6. Apparatus as set forth in claim 1 which futher includes:

first and second laser cavity mirrors disposed to cause said light beam to reverberate along said interaction axis to increase the intensity of radiation therealong.

7. Apparatus as set forth in claim 1 wherein said light source comprises:

a laser emanating radiation in the visible range of the spectrum.

8. Apparatus as set forth in claim 1 wherein said light source comprises:

a laser emanating radiation in the ultraviolet range of the spectrum.

9. Apparatus as set forth in claim 1 wherein said light source comprises:

a laser emanating radiation in the infrared range of the spectrum.

* * * * *

UNITED STATES PATENT AND TRADEMARK OFFICE
CERTIFICATE OF CORRECTION

PATENT NO. : 4,786,478

DATED : November 22, 1988

INVENTOR(S) : Samir Ahmed and John Gergely

It is certified that error appears in the above-identified patent and that said Letters Patent is hereby corrected as shown below:

On the title page:

"[73] Assignee: Conoco Inc., Ponca City, Okla." should be deleted.

Signed and Sealed this

Thirteenth Day of June, 1989

Attest:

DONALD J. QUIGG

Attesting Officer

Commissioner of Patents and Trademarks